Jan. 10, 1950 H. W. TREVASKIS 2,494,461
FLUID OPERATED BRAKE SYSTEM
Filed May 2, 1947
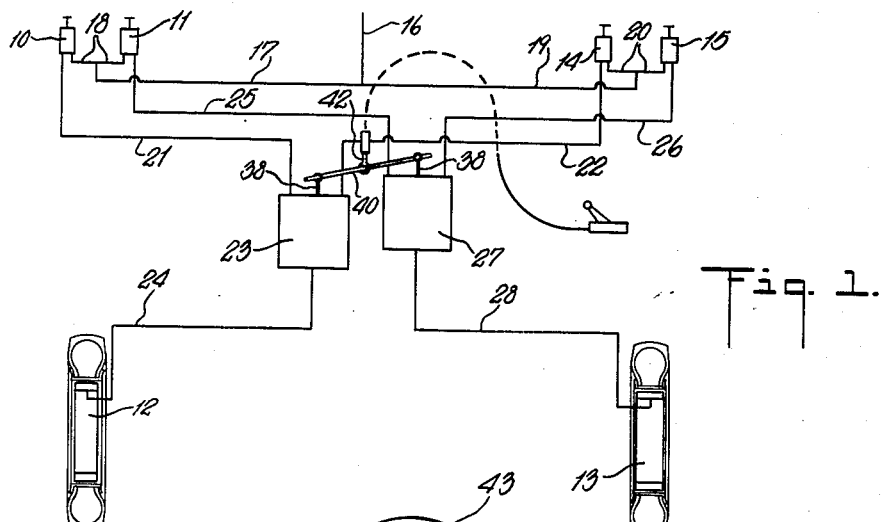
INVENTOR.
HENRY WILLIAM TREVASKIS
BY
Benj. T. Rauber
ATTORNEY Patented Jan. 10, 1950

2,494,461

UNITED STATES PATENT OFFICE 2,494,461

FLUID OPERATED BRAKE SYSTEM

Henry William Trevaskis, Solihull, Birmingham, England, assignor to Dunlop Rubber Company Limited, London County, England, a British corporation Application May 2, 1947, Serial No. 745,479
In Great Britain May 20, 1946

4 Claims. (Cl. 188—152)

My invention relates to fluid operated brake systems for aircraft provided with duplicate sets of controls for the fluid transmission lines, one pair of duplicate controls operating the brakes on one side of the aircraft and the other pair of duplicate controls operating the brakes on the other side of the aircraft.

In such brake systems it is known to provide, in the fluid transmission lines from each pair of duplicate controls to the corresponding brake-applying means, a valve unit which on the release of fluid pressure by one control of the pair to operate the brakes seals off the fluid transmission line connected to the other control. With brake systems of this type, however, it is possible for one pilot to release the brakes inadvertently after they have been applied by the other pilot for parking purposes.

The present invention provides means which renders the pairs of duplicate controls inoperative when the brakes are in a parking condition.

According to the invention fluid-operated brake systems of the above type are provided with a master control device adapted to place both the valve units simultaneously either in an operative position in which either pilot can release fluid pressure through the valve units for application of the brakes or in an inoperative position in which the fluid transmission lines for both pairs of controls to the valve units are sealed off.

The various features of my invention are illustrated by way of example in the accompanying drawings in which Fig. 1 is a diagrammatic representation of a fluid operated aircraft braking system embodying my invention;

Fig. 2 is a sectional view on a larger scale of a master control device to place the braking units simultaneously in operative or in inoperative position and showing the parts in position to permit operation of the brakes;

Fig. 3 is a view similar to that of Fig. 2 but showing the parts in "parking" or inoperative position.

In the embodiment shown in Fig. 1 the brake system shows a pair of control units 10 and 11 at one station for operation by one pilot to control respectively the brakes 12 and 13 on opposite sides of the plane or aircraft, and a second pair of control units 14 and 15 which may independently control the operation of the brakes 12 and 13.

Pressure fluid is supplied from a main 16 through a line 17 and branches 18 to the control units 10 and 11, and similarly through a line 19 and branches 20 to the control units 14 and 15.

The pressure fluid supplied from the main 16 to the control units 10 and 14 may be admitted or released through supply pipes 21 and 22 to one unit 23 of a master control unit and thence through a connecting line or delivery pipe 24 to or from the brake 12 or to a suitable mechanism to control the admission of fluid to the brakes.

Similarly fluid supplied from the main 16 may be admitted or released through the supply pipes 25 and 26 to a second unit 27 of the master control and thence through a supply pipe 28 to or from the brake apparatus 13. Each of the brake apparatus 12 and 13 is, therefore, under the independently acting controls 10 and 11 and 14 and 15 respectively through the master control units 23 and 27. These units may, however, be set in "parking" position in which brake fluid cannot be released from the brakes.

The construction and operation of the master control unit 23 is shown in Figs. 2 and 3, it being understood that control unit 27 is the same in all respects. This unit comprises a box or chamber having a pair of spaced cylindrical bores 29 and 30, the upper ends of which are closed respectively by screw plug connectors 31 and 32 having passages for connection to the supply pipes 21, 22, respectively.

In the cylindrical bores 29 and 30 are valve pistons 33 and 34 which may move upwardly to close against valve seats formed on the bottoms of the connecting plugs 31 and 32 respectively, or downwardly toward open position.

The chamber or box 23 is also provided with an outlet connector plug 35 which connects to the delivery pipe 24.

The valve pistons 33 and 34 are pivotally connected to the ends of a floating lever 36 which is secured at a point mid way of the valve pistons 33 and 34 to a bracket 37 movable vertically by means of a link 38. This link passes through a fluid-tight packing gland 39 in the cover of the chamber and is connected at its upper end in an articulated connection to a cross-rod 40 which also connects a similar link of the second control unit 27.

As shown in Fig. 2 the link 38 is normally pushed downwardly by a spring 41 confined between the bracket 37 and a recess in the top wall or cover of the chamber 23 so as to hold one or both of the valve pistons 33 and 34 in open position and thus to permit free passage of fluid from the delivery pipe 24 to or from either of the pipes 21 and 22. When fluid is forced through the connector 32 and bore 30 it forces the piston valve downwardly out of the bore and tilts the lever to the position shown in Fig. 2 closing valve 33 and, conversely, when valve 33 is forced downwardly to open position the lever 36 is tilted to close valve 34. This is the normal position of the apparatus when the control units are not in "parking" position.

When the apparatus is set for parking the connecting or cross-rod 40 is raised to the position shown in Fig. 3 by means of a lifting rod 42 to which it is pivotally connected at approximately its mid point and which in turn is lifted by a cable 43, one end of which is secured to the lifting rod 42 and the other end of which is secured to a parking lever 44. When this lever is moved to the position shown in Fig. 3 it raises the lifting rod 42 and the link 38 and thereby raises the floating lever 36 until each of the piston valves 33 and 34 is closed tightly on the lower valve face of its respective plug 31 or 32. In this position no fluid can be released from the delivery pipe 24, or 28, and the brakes once applied cannot be released until the parking lever is moved to the position of Fig. 2.

When the plane is to be parked the brakes are applied by operation of the control units 10 and 11 or 14 and 15 and the parking lever 44 moved to the position shown in Fig. 3. The pressure fluid is thereupon trapped in the brake system and cannot be released from any of the stations 10, 11, 14 or 15 until the parking lever is moved to the position shown in Fig. 2. Accordingly it is impossible to release the brakes inadvertently from their parking condition.

Having described my invention, what I claim is:

1. Fluid control brake apparatus which comprises a pair of brake applying means, two pairs of manual control units, one for each brake applying means, to control independently admission of fluid to, or its release from, said brake applying means, a master control for each brake applying means having a pair of valves, one for each of said control units, opening under fluid pressure from its respective control unit to its respective brake applying means, a lever connecting said valves to close one when the other is opened by fluid pressure, and a fulcrum for said lever movable to close both said valves.

2. The apparatus of claim 1 having a lever connected to the fulcrums of both said master controls and means acting on said lever between said fulcrums to move said fulcrums.

3. The apparatus of claim 1 in which said master control has a cylindrical bore for each valve of said pair in said unit between its open and closed position.

4. A master control for fluid pressure operated apparatus which comprises a hollow casing having an outlet and a pair of axially parallel inlets opening into said casing, a rod-like member having one end extending into the casing, said member being equidistantly spaced between said inlets, a lever pivoted on said end, and valves, one pivotally mounted on said lever within the casing on each side of the pivot, each valve being positioned to close one of said inlets, said member being movable parallel to said inlets between a position wherein each valve is held on its respective inlet and a position wherein the lever and its associated valves are free to rock about its pivot.

HENRY WILLIAM TREVASKIS.

REFERENCES CITED

The following references are of record in the file of this patent:

UNITED STATES PATENTS

| Number | Name | Date |
|---|---|---|
| 1,517,956 | Compton | Dec. 2, 1924 |
| 2,024,549 | Tarris | Dec. 17, 1935 |
| 2,148,268 | Kerr | Feb. 21, 1939 |

FOREIGN PATENTS

| Number | Country | Date |
|---|---|---|
| 427,829 | Great Britain | May 1, 1935 |